US006972066B2

(12) United States Patent
Ishikawa et al.

(10) Patent No.: US 6,972,066 B2
(45) Date of Patent: Dec. 6, 2005

(54) ROLL, ROLL PRODUCTION APPARATUS AND METHOD FOR PRODUCING ROLL

(75) Inventors: Tetsuji Ishikawa, Hoofdorp (NL); Rovert Van Den Berg, Hoofdorp (NL)

(73) Assignees: Sony Corporation, Tokyo (JP); Sony Chemicals Corp., Tokyo (JP)

( * ) Notice: Subject to any disclaimer, the term of this patent is extended or adjusted under 35 U.S.C. 154(b) by 0 days.

(21) Appl. No.: 11/077,131

(22) Filed: Mar. 11, 2005

(65) Prior Publication Data

US 2005/0155701 A1 Jul. 21, 2005

Related U.S. Application Data

(63) Continuation of application No. 09/883,385, filed on Jun. 19, 2001, now abandoned.

(30) Foreign Application Priority Data

Jun. 19, 2000 (JP) ............................ 2000-182387
Jun. 11, 2001 (JP) ............................ 2001-175940

(51) Int. Cl.[7] ............................................... B32B 31/00
(52) U.S. Cl. ...................... 156/259; 156/271; 156/252; 156/387; 156/513; 156/446; 156/187; 156/188; 156/190; 156/192; 156/265; 242/580; 242/530.1
(58) Field of Search ................................ 156/387, 514, 156/542, 259, 252, 269, 270, 271, 446, 171, 156/172, 187, 188, 190, 192, 265, 184, 185; 206/389; 242/580, 525, 525.1, 525.4, 530.1

(56) References Cited

U.S. PATENT DOCUMENTS

| | | | |
|---|---|---|---|
| 3,966,534 | A | 6/1976 | Oddy |
| 4,339,294 | A | 7/1982 | Jones |
| 5,492,221 | A | 2/1996 | Light et al. |
| 5,560,722 | A | 10/1996 | Kawaguchi |
| 5,620,544 | A | 4/1997 | Cram et al. |
| 6,371,187 | B1 | 4/2002 | Nowaczyk |
| 2003/0034645 | A1 | 2/2003 | Dronzek et al. |

FOREIGN PATENT DOCUMENTS

| | | |
|---|---|---|
| EP | 0 595 265 A2 | 10/1993 |
| JP | A 60-009784 | 1/1985 |
| JP | A 02-193851 | 7/1990 |
| JP | A 06-115229 | 4/1994 |
| JP | A 09-226197 | 9/1997 |
| JP | B 2726856 | 12/1997 |

*Primary Examiner*—Linda Gray
(74) *Attorney, Agent, or Firm*—Oliff & Berridge, PLC

(57) ABSTRACT

Rolls easy to be produced are provided. The invention provides a roll which is composed of a main tape cylindrically wound up. The main tape is provided with a first and second holes, respectively, in its winding terminating position and winding initiating position. First and second adhesive tapes are stuck over the holes, respectively. In the bottoms of the first and second holes, adhesive layers of the first and second adhesive tapes are exposed. Therefore, the main tape is stuck on a core at its winding initiating position and on the roll itself at its winding terminating position. Information may be printed on a surface of the first adhesive tape.

4 Claims, 14 Drawing Sheets

ROLL, ROLL PRODUCTION APPARATUS AND METHOD FOR PRODUCING ROLL

This is a Continuation of U.S. patent application Ser. No. 09/883,385 filed Jun. 19, 2001. The entire disclosure of the prior application is hereby incorporated by reference herein in its entirety.

BACKGROUND OF THE INVENTION

1. Field of the Invention

The present invention relates to rolls, particularly to the technology of forming rolls by winding main tapes.

2. Description of the Related Art

Reference numeral 150 in FIG. 18(*a*) denotes a conventional ink ribbon roll used for thermal transfer printers.

This ink ribbon roll 150 includes a cylindrical core 151 and an ink ribbon 152 wound around the core 151. Reference numeral 155 denotes a tab of the ink ribbon 152 and is positioned in the winding terminating position of the ink ribbon 152.

The tab 155 is constituted of a resin film and is stuck on the ink ribbon roll 150 itself with an adhesive tape 156*a* so that the ink ribbon 152 does not unwound spontaneously during transportation or handling.

FIGS. 18(*b*) and 18(*c*) show a state where the adhesive tape 156*a* was peeled from the ink ribbon roll 150 by picking up the tab 155, and the whole ink ribbon 152 has been unwound.

Reference numerals 153*a* and 153*b*, respectively, denote a leader tape and a trailer tape, both of which have no ink layers. The leader tape and the trailer tape have a width the same as that of the ink ribbon 152.

One end of the leader tape 153*a* is attached to the end of the winding terminating position of the ink ribbon 152 with the adhesive tape 156*b*. To the other end of the leader tape 153*a* is stuck the adhesive tape 156*a* as described above, to which the tab 155 is affixed.

On the leader tape 153*a*, literal information such as the name of the raw materials used and precautions on use and information by drawings are provided. The alphabets indicated by reference numeral 159 in FIGS. 18(*a*) and 18(*b*) show such information schematically.

One end of the trailer tape 153*b* is attached to the end of the ink ribbon 152 that will become the winding initiating position with the adhesive tape 156*c*, and the other end is stuck on the core 151 with another adhesive tape 156*d*. Therefore, the ink ribbon 152 is attached to the core 151 through this trailer tape 153*b*.

The above ink ribbon roll 150 is produced by cutting a wide ink film and winding each resulting film around the core 151.

Reference numeral 110 in FIG. 19 denotes an ink ribbon roll production apparatus of the prior art, including cutters 171 and 173 and a slit knife unit 174.

Reference numeral 160 denotes a roll that is constituted of a wound main film 162 having a wide ink film. One end of the main film 162 is sent from the roll 160, passes below the cutters 171 and 173, and is introduced to the slit knife unit 174.

The slit knife unit 174 has a plurality of knives and is constituted so that the main film 162 is cut along its running direction into a plurality of films when it passes through the slit knife unit 174, thereby producing narrow ink ribbons 152.

The arrow shown in FIG. 19 indicates the running direction of the main film 162 and the ink ribbon 152. In FIG. 19, one main film 162 is divided into seven, whereby seven ink ribbons 152 are produced.

In the side downstream from the slit knife unit 174 are installed a plurality of cores 151. Each ink ribbon 152 are wound on each core 151 respectively.

When a predetermined quantity of the ink ribbon 152 has been wound around the core 151, the run of the main film 162 and the ink ribbon 152 are suspended.

The cutters 171 and 173 are installed at a predetermined interval. When the run of the main film 162 and the ink ribbon 152 are suspended, the main film 162 is cut along its width direction at two places with the cutters 171 and 173. Subsequently, the removal of the portion of the main film 162 located between the cutters 171 and 173 divided the main film 162 into two.

Reference numeral 165 in FIG. 20 denotes the removed portion of the main film 162, and the resulting main films 162 are located downstream and upstream from the removed portion 165, i.e., in the right and left sides in FIG. 20.

At a position in the vicinity of the side of the main film 162 located between the cutters 171 and 173, three rolls 175–177, each having a wound auxiliary film, such as a resin film, are arranged.

After the division of the main film 162, the auxiliary films 185–187 are sent out from the rolls 175–177, respectively, and are inserted into the removed portion 165, as shown in FIG. 21.

After cutting the auxiliary films 185–187 into the width of the main film 162, the auxiliary films 185–187 and the ink films 162 of both sides of the removed portion 165 are adhered together with adhesive films 166*a*–166*d*. FIG. 22 shows this situation. The main films 162 once divided are connected together through the three auxiliary films 185–187 and the four adhesive films 166*a*–166*d*.

In such a state, when each core 151 is rotated, a main film 162 and the three auxiliary films 185–187 adhered thereon run together and pass through the slit knife unit 174.

Then, a leader tape 153*a* located in the winding terminating position of an ink ribbon 152 is first formed from the auxiliary film 187 that passes the slit knife unit 174 first among the three auxiliary films 185–187. Subsequently, a tab 155 is formed from the auxiliary film 186 that passes next.

The adhesive film 166*a*, which passes the slit knife unit 174 second among the four adhesive films 166*a*–166*d*, has a back surface partially exposed. When the adhesive film 166*a* passes through the slit knife 174, an adhesive tape 156*a* shown in FIG. 18(*b*) is obtained.

After the formation of the tab 155, the tab 155 is stuck on the roll 150 itself with the adhesive tape 156*a*.

Subsequently, when the tab 155 is cut along its width direction, a plurality of rolls 150 are obtained.

The rolls 150 are removed and new cores 151 are installed. When the main film 162 is run and the last auxiliary film 185 passes through the slit knife unit 174, trailer tapes 153*b* are obtained from the auxiliary film 185. Each of the trailer tapes 153*b* is stuck on the winding initiating position of new ink ribbon 152.

Of the above-mentioned auxiliary films 185–187, the auxiliary film 187, which becomes a leader tape 153*a*, has predetermined items in the form of characters, figures, etc. printed thereon. The black dots indicated by reference numeral 179 in FIGS. 19–21 show the printing schematically.

Moreover, in the above-mentioned ink ribbon roll production apparatus 110, the leader tape 153*a* and trailer tape 153*b* can be changed through exchanging the auxiliary films 185–187 for other kinds of films. Various kinds of ink ribbon rolls 150 can be produced by use of various films, for example, such as a transparent film, a colored film and an aluminum-deposit film, depending upon the type of the ink ribbon 152.

However, the ink ribbon producing apparatus of the prior art is required to use auxiliary films 185–187 with necessary items printed thereon. Therefore, in the production of rolls which differ in winding amount or which differ in indicating item required, for example, in the case where the rolls will be shipped for countries using different languages, it will become necessary to exchange the auxiliary films 185–187 even if the same ink ribbon 152 is used. Particularly, since it becomes necessary to indicate the method of handling, etc. on the leader tape 153*a*, it will be necessary to frequently exchange the auxiliary film 187 corresponding to it.

Moreover, although the adhesive films 166*a*–166*d* are manually installed and stuck each other when the auxiliary films 185–187 are stuck on the main films 162, there is a problem with such a process of being complicated and high-cost.

SUMMARY OF THE INVENTION

The present invention was created to solve the inconvenience of the above-described prior art, and an object thereof is to provide a roll that can be manufactured by a simple process and a roll production apparatus for manufacturing such a roll.

In order to solve the above-mentioned problem, the present invention is a roll comprising a main tape cylindrically wound, the roll comprising a first adhesive tape having an adhesive layer and a print layer laminated thereon wherein the adhesive layer of the first adhesive tape is stuck on a surface of the main tape located in the vicinity of a winding terminating position thereof.

The present invention is the roll wherein a width of the first adhesive tape is equal to a width of said main tape.

The present invention is the roll wherein a desired item is printed on the print layer.

The present invention is the roll wherein a first hole is formed in the vicinity of the winding terminating position of the main tape, said first adhesive tape being stuck over the first hole, and wherein a adhesive layer of the first adhesive tape is stuck, through the first hole, on the surface of the main tape located under the main tape at said winding terminating position.

According to the present invention, the roll further comprising a core, the main tape being wound up around the core, wherein a second hole is formed in a winding initiating position of the main tape, a second adhesive tape having an adhesive layer is stuck on a surface of a portion of the main tape where the second hole is located, and the adhesive layer of the second adhesive tape exposed in the second hole is stuck on the core.

According to the present invention, a roll comprising a core and a main tape wound up around the core, wherein a second hole is formed in a winding initiating position of the main tape, a second adhesive tape having an adhesive layer is stuck on a surface of the main tape where the second hole is located, and the adhesive layer of the second adhesive tape exposed in the second hole is stuck on the core.

According to the present invention, a roll production apparatus for producing a roll by cutting a wide main film along its running direction while running the main film to produce a plurality of narrow main tapes, and by winding each main tape around a core, the apparatus comprising a perforator for opening a hole in the main film and an adhesive film sending-out unit for sending an adhesive film having an adhesive layer to a surface of said main film located in the vicinity of a position where the hole has been opened, and the apparatus being constituted so as to stick the adhesive film on said main film over said hole, followed by cutting said adhesive film together with said main film along its running direction.

The present invention is the roll production apparatus wherein the adhesive film sending-out unit is a printer constituted so as to print desired information on the surface of the adhesive film.

The present invention is the roll production apparatus according wherein said printer is constituted so as to print said information on the adhesive film, followed by sending the adhesive film in a direction the same as the running direction of the main film.

The present invention is the roll production apparatus according wherein the apparatus is constituted so that the adhesive film is printed with the information, followed by being stuck on the main film running.

The present invention is the roll production apparatus wherein said printer is disposed so as to print the information on the adhesive film, followed by sending the adhesive film in the direction approximately right angle to the running direction of the main film.

According to the present invention, a process for producing a roll comprising cutting a wide main film along its running direction while running it in the direction perpendicular to its width, thereby producing a plurality of narrow main tapes, followed by winding each cut main tape to produce a roll, the process comprising the steps of sending an adhesive film from a roll comprising the adhesive film wound, printing a desired item on a surface of the adhesive film, arranging said adhesive film on a surface of a portion of the main film where the portion becomes a winding terminating position of the main tape, sticking the adhesive film on a surface of the main film, moving the adhesive film and the main film together along their running direction, and cutting the adhesive film together with said main film.

The present invention is the process for producing a roll wherein a hole is formed in the main film and the adhesive film is thereafter stuck over the hole.

The present invention is the process for producing a roll wherein the adhesive film is sent in the direction along the running direction of the main film and is stuck on a surface of the main film.

The present invention is a process for producing a roll wherein said adhesive film is sent in the direction right angle to the running direction of said main film and is stuck on a surface of said main film.

According to the present invention, a process for producing a roll comprising cutting a wide main film along its running direction while running it in the direction perpendicular to its width, thereby producing a plurality of narrow main tapes, followed by winding each cut main tape to produce a roll, the process comprising the steps of sending an adhesive film from a roll comprising the adhesive film wound, printing a desired item on a surface of the adhesive film, arranging the adhesive film on a surface of a portion of the main film where the portion becomes a winding initiating position of the main tape, sticking the adhesive film on a surface of a core.

The roll according to the present invention is constituted as mentioned above and a first adhesive tape is stuck on the winding terminating position of a main tape. The surface of the first adhesive tape is printable. For example, a print layer may be disposed on the surface of the first adhesive tape. Accordingly, characters, figures or the like can be printed on the opposite surface of the first adhesive tape to the adhesive layer with a printer.

One may prepare a first adhesive tape with no necessary indication printed thereon and then print such indication required on the surface of the first adhesive tape just when manufacturing a roll according to the present invention. Therefore, there is no necessity of preparing any trailer tape printed with predetermined items in advance.

In particular, when preparing a unfigured adhesive film and printing on a surface thereof, followed by sticking it to a main film and then slitting the main film and the adhesive tape together, the adhesive tape becomes to have the same width as that of the main tape.

It is also possible to print some necessary items on a adhesive film after the adhesive film stick on a main film, and followed by slitting it.

In this case, when slitting the main film to form main tapes and then winding the resultant into the form of rolls, it is desirable that a portion in the winding terminating position of each main tape is stuck on each roll itself so that the main tape does not unwind spontaneously before use.

In the present invention, a first hole penetrating a main tape is formed in advance in the main tape in its portion at the winding terminating position. The adhesive layer of the first adhesive tape is stuck on the surface of the main tape over the first hole, the surface constituting the outside of the roll.

Therefore, the adhesive layer of the first adhesive tape is exposed inside the first hole. When the main tape is wound up with the print layer of the first adhesive tape outside, the winding terminating portion of the main tape will be affixed, with the adhesive layer of the first adhesive tape exposed in the bottom of the first hole, to the main tape itself located in the inner circumference of the roll. Therefore, the roll according to the present invention is constituted so that the winding terminating portion of the main tape does not unwind spontaneously from the roll.

Moreover, the first adhesive tape used for the roll according to the present invention has a print layer in its surface and can be printed with characters or figure with printers such as inkjet printers and thermal transfer printers.

A portion that is first sent out from the roll is in the winding terminating position of the main tape. Therefore, it is convenient if the method of using or handling the roll, etc. is indicated on the surface of the first adhesive tape that is to be stuck on that portion. The first hole may be formed in advance in the main film.

Moreover, the main tape used in the present invention is provided with a second hole in its winding initiating position. The second hole also penetrates the main tape. The surface of the main tape located in the inner circumference of the roll is located in the second hole.

On a surface of the main tape in the region where the second hole is located, the second adhesive tape having at least an adhesive layer is stuck. Since the surface of the adhesive layer is exposed in the bottom of the second hole, when the winding initiating portion is pushed against the outer peripheral surface of the cylindrical core with the second adhesive tape outside, the second adhesive tape is stuck on the core in the bottom of the second hole, whereby the main tape is stuck on the core.

If a print layer is provided also in the surface of the second adhesive tape, desired information can be printed thereon with a printer.

In this case, adhesive films that will become the raw films of the first and second adhesive tapes are, in advance, prepared after being wound into the form of rolls. The adhesive films are drawn from the rolls, printed with necessary items, cut to length required, and then stuck on the surface of the main film. When the main film is slit, the adhesive tapes are also slit together, yielding first and second adhesive tapes stuck on the main tapes.

In this case, the printing to the first or second adhesive film and the sticking of the first or second adhesive film on these main films will be performed by turns.

Moreover, the roll production apparatus according to the present invention has a perforator for opening holes in the main film after sending out the main film from that wound in the form of a roll. When the adhesive film is stuck on the region of the main film where holes have been formed with the adhesive layer of the adhesive film directed toward the main film and the substrate layer thereof directed toward the top surface side, the adhesive layer is exposed in the bottom inside the holes.

Moreover, the roll production apparatus according to the present invention has an adhesive film sending-out unit for sending out an adhesive film above the main film. If a printer is used as the adhesive film sending-out unit, desired information can be printed on the substrate layer of the adhesive film before sticking the adhesive film to the main film.

The perforator in the roll production apparatus according to the present invention can make holes in a main film in both portions thereof which will become the winding initiating position and the winding terminating position of a main tape, respectively, when the main film is cut along its longitudinal direction and is wound up to the form of a roll. The adhesive film may be stuck on the region where the hole has been arranged.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 2(*b*) is a sectional view in the winding terminating position;

FIG. 3(*c*) is a sectional view in the winding initiating position;

FIG. 13(*b*) and 13(C) respectively shows a side view and a plan view for illustrating an adhesive film using the printer;

FIG. 14(*b*) shows the perforator in the state during forming hole.

DETAILED DESCRIPTION OF THE PREFERRED EMBODIMENTS

Figure 1:
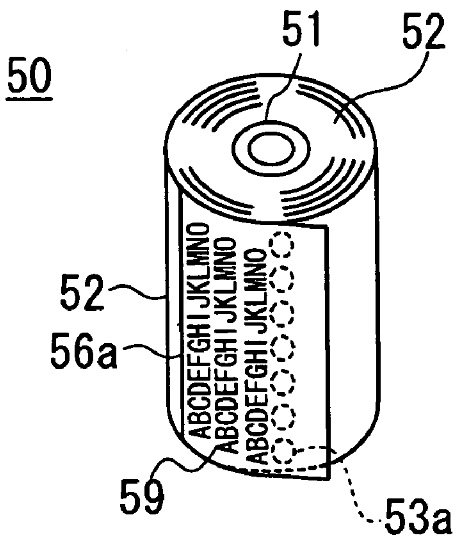
FIG. 1 shows an example of the roll according to the present invention.

Reference numeral 50 in FIG. 1 denotes an ink ribbon roll, which is an example of the roll according to the present invention.

This ink ribbon roll 50 has a core 51, around the side surface of which has been wound an ink ribbon 52 for heat transfer printers. The ink ribbon 52 is an example of the main tape used for the present invention and is formed to be narrow in width.

In the winding terminating position of the ink ribbon 52, a plurality of first holes 53*a* are formed. The first holes 53*a* penetrate the ink ribbon 52 and are aligned along the width direction of the ink ribbon 52. Although only a single line of the holes is shown in this diagram, the holes may be arranged in plural lines.

On the region of the ink ribbon 52 in the winding terminating position where the first holes 53*a* are located, a first adhesive tape 56*a* is stuck.

Figure 2A:
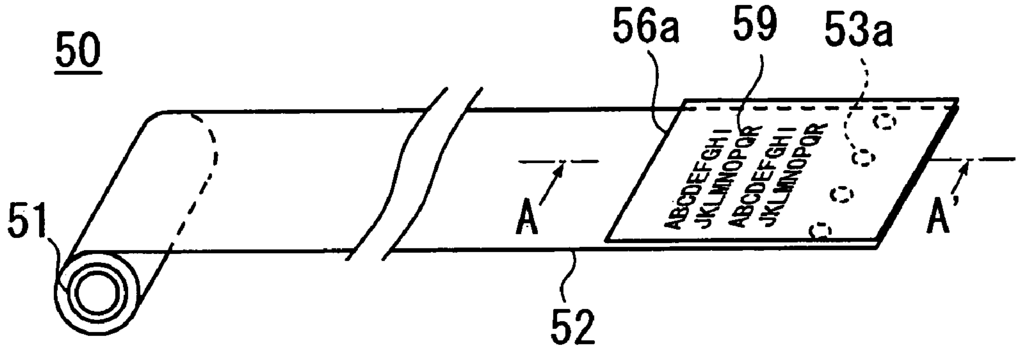
FIG. 2(*a*) is a diagram illustrating the state where a portion in a winding terminating position has been sent out from the roll shown in FIG. 1.
Figure 2B:
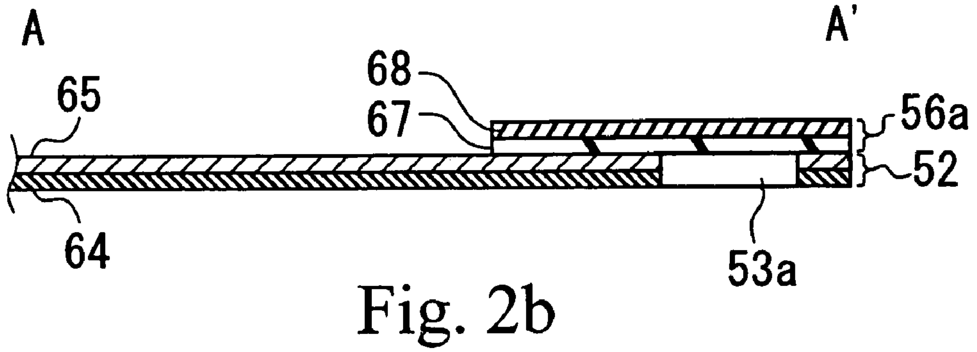

FIG. 2(*a*) shows the state where only a small amount of ink ribbon 52 has been sent out from the ink ribbon roll 50. FIG. 2(*b*) is a sectional view taken along the A–A' line of FIG. 2(*a*).

The ink ribbon 52 has a substrate layer 65 composed of a resin film such as polyester, and an ink layer 64, formed on the surface of the substrate layer 65, including ink for thermal transfer printing.

The first adhesive tape 56*a* has a print layer 68 and an adhesive layer 67 which is formed on the surface of the print layer 68 and exhibits adhesiveness at normal temperature. The print layer 68 is constituted by laminating a resin film, such as a polyester film, and a layer for improving ink fixing properties, for example, a surface treatment layer. The adhesive layer 67 is formed on the surface of the resin film in the print layer 68 and the surface treatment layer of the print layer 68 is exposed, whereby the first adhesive tape 56*a* has improved printability.

The adhesive layer 67 of the first adhesive tape 56a is stuck to the surface of the substrate layer 65 of the ink ribbon 52. Since the first holes 53*a* are arranged in the portion of the ink ribbon 52 on which the first adhesive tape 56*a* is stuck, the adhesive layer 67 is exposed in the bottoms of the first holes 53*a*.

In the state where the ink ribbon 52 is wound up around the core 51, the adhesive layer 67 exposed in the bottoms of the first holes 53*a* is closely attached to the surface of the substrate layer 65 of the ink ribbon 52 located inside the winding terminating position, and the winding terminating portion of the ink ribbon 52 is affixed to the ink ribbon 52 itself. Accordingly, in this ink ribbon roll 50, a portion in the winding terminating position of the ink ribbon 52 does not unwind spontaneously from the ink ribbon roll 50.

Furthermore, information 59, such as the method of usage and precautions, is indicated in the print layer 68 of the first adhesive tape 56*a* by using a printer described later.

Figure 3A:
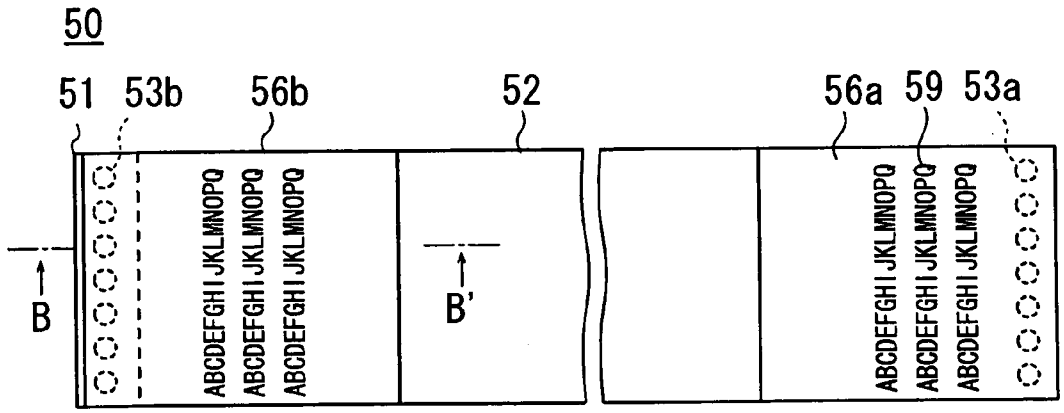
FIGS. 3(*a*) and 3(*b*) are, respectively, a plan view and a side view for illustrating the state where the whole of the tape has been sent out from the roll according to the present invention.
Figure 3B:
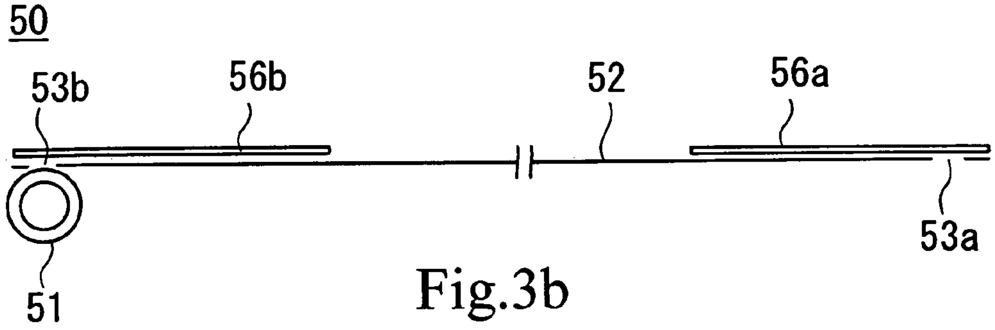
Figure 3C:
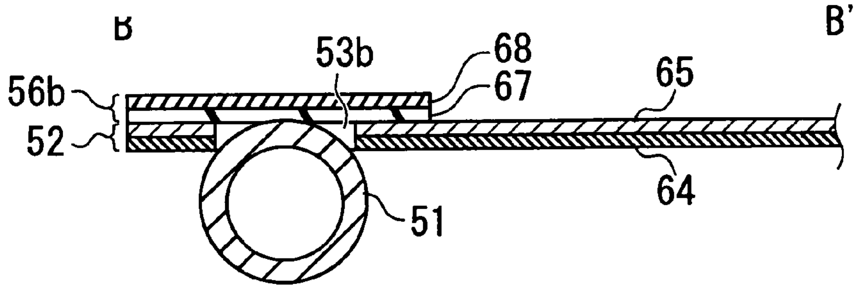

FIG. 3(*a*) is a plan view illustrating the state where the whole ink ribbon 52 has been unwound from the ink ribbon roll 50, and FIG. 3(*b*) is the side view showing the same state. FIG. 3(*c*) is a sectional view taken along the B–B' line in FIG. 3(*a*).

In the winding initiating position of the ink ribbon 52 are formed a plurality of second holes 53*b*. The second holes 53*b* penetrate the ink ribbon 52 and are aligned along the width direction of the ink ribbon 52. Although only a single line of the holes is shown in this diagram, the holes may be arranged in plural lines.

A second adhesive tape 56*b* having a structure the same as the first adhesive tape 56*a* is stuck on the surface of the ink ribbon 52 in the winding initiating position. The adhesive layer 67 of the second adhesive tape 56*b* is exposed in the bottoms of the second holes 53*b*.

The adhesive layer 67 exposed in the second holes 53*b* is adhered to the surface of the core 51, whereby the winding initiating portion of the ink ribbon 52 is stuck on the core 51.

Reference numeral 10 in FIGS. 4 through 7 indicates an example of the ink ribbon roll production apparatus for manufacturing the ink ribbon rolls 50 mentioned above.

Figure 4:
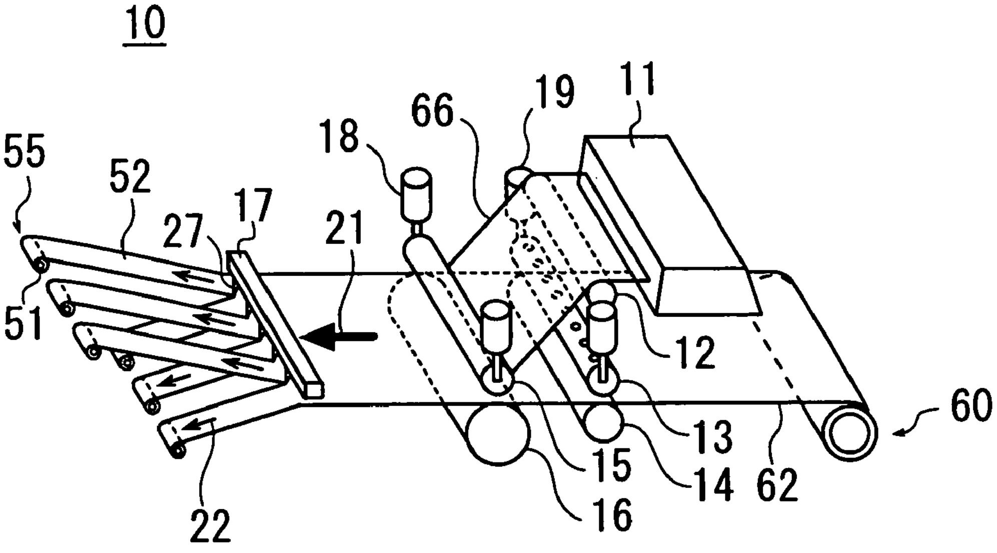
FIG. 4 is a diagram for illustrating a roll production apparatus and production process according to the present invention.

With reference to FIG. 4, this ink ribbon roll production apparatus 10 has a printer 11, a perforator 13 and a slit knife unit 17. The printer 11 is an example of adhesive film sending-out unit that can be used in the present invention.

Reference numeral 62 in FIG. 4 denotes an ink film, which is an example of the main film of the present invention. This ink film 62 is wide in width and has a sectional structure the same as the ink ribbon 52 including a substrate layer 65 and an ink layer 64 laminated thereon.

Reference numeral 60 in FIG. 4 shows an ink film roll constituted of the ink film 62 wound up.

The ink film 62 sent out from the ink film roll 60 passes below the perforator 13 and through between a pair of press rolls 15 and 16, thereby being introduced below the slit knife unit 17.

The arrow represented by reference numeral 21 in FIG. 4 indicates the running direction of the ink film 62 at the time when the ink film 62 is sent out from the ink film roll 60. The slit knife unit 17 has a plurality of knives 27 on its bottom. When the ink film 62 passes below the slit knife unit 17, it is cut in parallel to its running direction with each knife 27. In the result, a plurality of ink ribbons 52 are produced. In FIG. 4, the slit knife unit 17 has five knives 27 and six ink ribbons 52 are obtained from a single ink film 62.

Reference numeral 22 in FIG. 4 indicates the running direction of each ink ribbon 52. The plural ink ribbons 52, which have been formed in and sent out from the slit knife unit 17, are alternately distributed upwardly and downwardly.

Cores 51 corresponding to the number of the ink ribbons 52 are disposed at the terminals of the ink ribbons 52 in their running direction. Each ink ribbon 52 is wound around each core 51, whereby an ink ribbon roll is formed. Reference numeral 55 denotes an ink ribbon roll under winding.

The printer 11 and the perforator 13 are disposed above the ink film 62 in the upstream side from the slit knife unit 17.

Figure 13A:
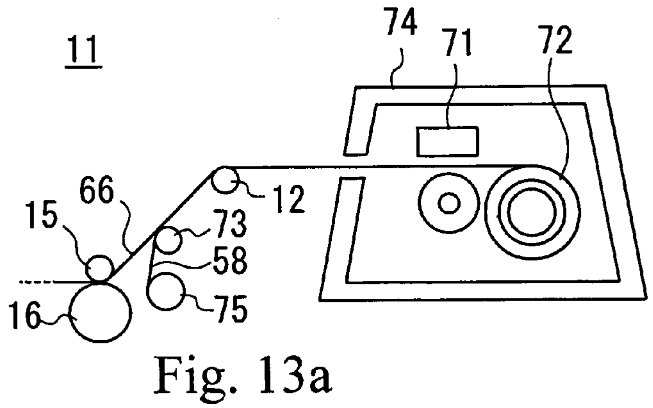
FIG. 13(*a*) shows an example of printers that can be used for the present invention.
Figure 13B:
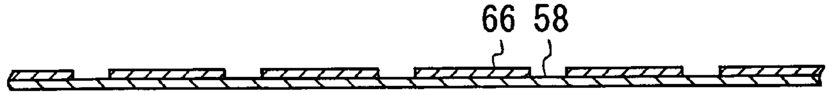
Figure 13C:
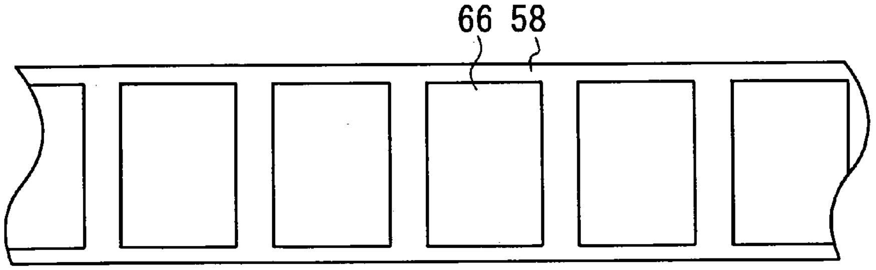

The internal outline composition of the printer 11 is shown in FIG. 13(*a*).

The printer 11 has a housing 74, in which an adhesive film roll 72 including an adhesive film 66 wound up in the form of a roll is disposed.

The adhesive film roll 72 is constituted of a long and thin peeling paper 58 and a plurality of adhesive films 66 stuck thereon at equal intervals. FIG. 13(*b*) is a sectional view showing the state where the peeling paper 58 and the adhesive films 66 are sent out from the adhesive film roll 72, and FIG. 13(*c*) is the corresponding plan view. Each adhesive film 66 is a rectangle and they are arranged in a raw along the longitudinal direction of the peeling paper 58 at predetermined intervals.

The adhesive film 66 which has a structure the same as the first and second adhesive tapes 56*a* and 56*b* as shown in FIG. 2(*a*) and 2(*b*), is composed of an adhesive layer 67 and a print layer 68. To the peeling paper 58 is tightly attached the adhesive layer 67 of the adhesive film 66, and the surface of the print layer 68 is exposed.

A printing head 71 is disposed inside the housing 74 so that the print layer 68 of the adhesive film 66 faces the printing head 71 when the adhesive film 66 is sent out together with the peeling paper 58 from the adhesive tape roll 72.

When the peeling paper 58 runs, the adhesive film 66 runs below the printing head 71 while its print layer 68 faces the printing head 71. Therefore, when the printing head 71 is caused to approach the print layer 68 of the adhesive film 66 in that state and is caused to emit ink therefrom, characters, figures, etc. are printed with the ink on the print layer 68.

After predetermined indication items are printed, the adhesive film 66 is sent together with the peeling paper 58 approximately horizontally out of the housing 74. In this state, the adhesive film 66 faces upward and the peeling paper 58 faces downward.

A rotation roll 12 is disposed at a position to which the adhesive film 66 and the peeling paper 58 both sent out from the housing 74 run. The peeling paper 58 comes into contact with the rotation roll 12, whereby its running direction is slanted downward. At a position to which the adhesive film 66 and the peeling paper 58 after the change of their running direction run, a separation roll 73 is disposed.

The peeling paper 58 that has reached the separation roll 73 is bent downward at a steep angle and wound around a peeling paper winding roll 75.

When the peeling paper 58 is bent at a steep angle, the adhesive film 66 leaves the peeling paper and runs in the direction different from the peeling paper 58.

Two press rolls 15 and 16 are installed at a position to which the adhesive film 66 runs.

Each axis of rotation of the press rolls 15 and 16 is directed in a right-angled direction to the running direction of the adhesive film. The adhesive film 66 which has left the peeling paper 58 is sent to between the two press rolls 15 and 16. In FIG. 13(*a*) the adhesive films 66 are sent to between the press rolls 15 and 16 while being separated from each other. However, it is also possible to stick low-tack adhesive tapes to the surfaces of the adhesive films 66 before separating the adhesive films 66 from the peeling paper 58, and send the adhesive films 66 to between the press rolls 15 and 16 while linking the adhesive films 66 together.

As shown in FIG. 4, an ink film 62 is sent to between the press roll 15 and 16.

A cylinder 18 is mounted to the upper press roll 15. When a predetermined length of the ink ribbon 62 is wound around the core 51, the cylinder 18 is activated. When the upper press roll 15 is moved downward by the activation of cylinder 18, the ink film 62 and the adhesive films 66 are pinched between the press rolls 15 and 16, whereby the adhesive layer 67 located in the head portion in the running direction of the adhesive films 66 is attached firmly to the surface of the substrate layer 65 of the ink film 62 and the adhesive film 66 is partially stuck on the ink film 62.

Since the direction in which the adhesive films 66 are sent out from a printer 11 is the same as the running direction of the ink film 62, the adhesive films 66 are stuck on the ink film 62 without stopping the ink film 62.

On the other hand, the plural adhesive films 66 are separated from each other. Therefore, when one adhesive film 66 is stuck on the ink film 62, the run of the peeling paper 58 is stopped and a plurality of adhesive films 66 are not stuck on the ink film 62 continuously.

When the two press rolls 15 and 16 are rotated in this state, the adhesive film 66 is stuck on the ink film 62 from its head portion with the rotation.

Figure 5:
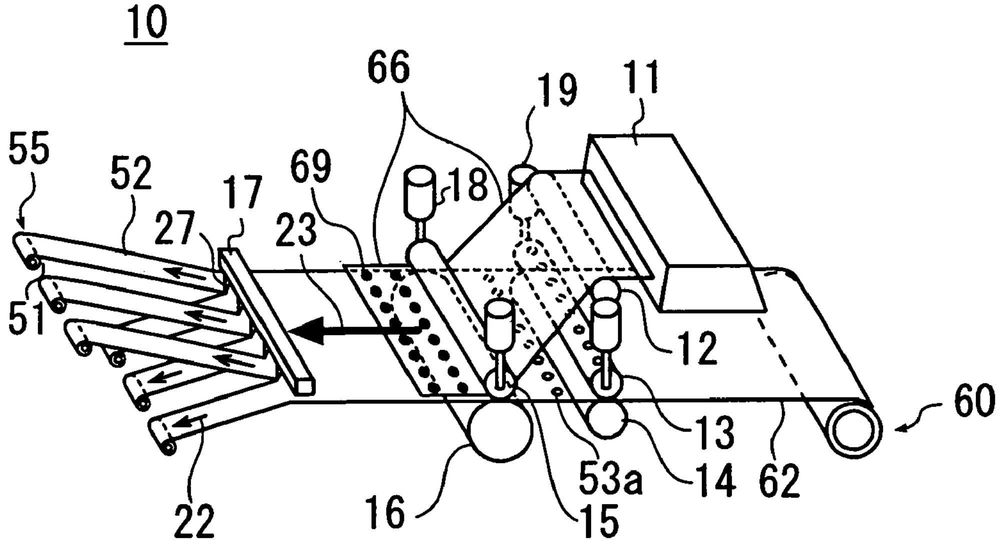
FIG. 5 is a diagram for illustrating the production step following that shown in FIG. 4.

FIG. 5 shows the state where the adhesive film 66 has been stuck to a length about a half from the head portion. The arrow indicated by reference numeral 23 shows the running direction of the ink film 62 and the adhesive film 66 stuck on the ink film 62. Reference numeral 69 shows the predetermined information printed with the printer 11.

Before the establishment of this state, a cylinder 12 is activated, thereby a perforator 13 is pressed against the ink film 62, forming first holes 53*a* in the portion on which the adhesive film 66 will be stuck.

Figure 14A:
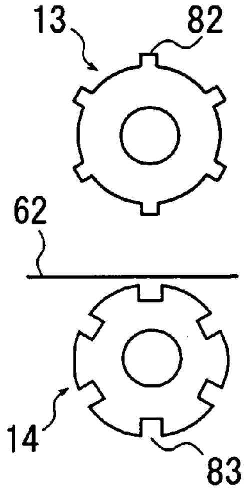
FIG. 14(*a*) shows an example of a perforator used for the present invention in the state that before the perforator forms hole.
Figure 14B:
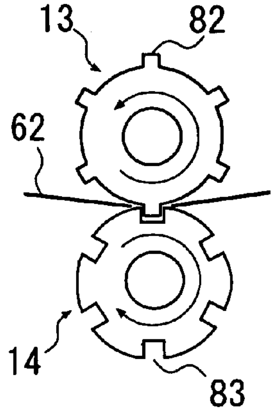

Explaining the structure of the perforator 13, the perforator 13 is cylindrical and has a plurality of projections 82 in its circumference, as shown in FIG. 14(*a*).

In the back side of the ink film 62 below the perforator 13, a cylindrical reception roll 14 is disposed.

The axes of rotation of the perforator 13 and the reception roll 14 are perpendicularly arranged to the running direction of the ink film 62. In the surface of the reception roll 14, recesses 83 are formed in the positions corresponding to the projections 82 of the perforator 13.

Therefore, by the operations of moving the perforator 13 downward while rotating the perforator 13 and the reception roll 14, pressing the perforator 13 against the ink film 62 running, and thereafter fitting the projections 82 into the recesses 83 as shown in FIG. 14(*b*), the ink film 62 is punched with the projections 82, whereby the first holes 53*a* are formed.

When the first holes 53*a* are formed, the cylinder 12 is activated and the perforator 13 is caused to leave the ink film 62. As described above, since the first holes 53*a* are formed while the perforator 13 and the reception roll 14 are rotated, it is not necessary to stop the run of the ink film 62 during the formation of the first holes 53*a*.

Figure 6:
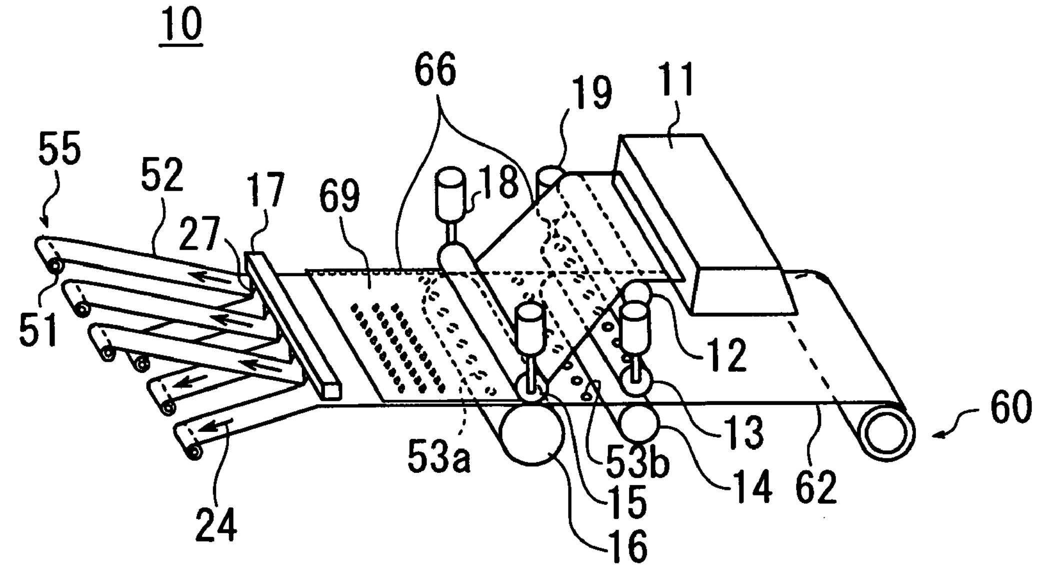
FIG. 6 is a diagram for illustrating the production step following that shown in FIG. 5.

When the rolls 15 and 16 rotate and the ink film 62 and the adhesive film 66 run together toward the slit knife unit 17 in that state, one adhesive film 66 is stuck on the region of the ink film 62 where the first holes 53*a* are arranged, whereby the adhesive layer 67 of the adhesive film 66 is exposed in the bottoms of the first holes 53*a* as shown in FIG. 6.

When one adhesive film 66 is sent out from between the press rolls 15 and 16, the adhesive film 66 will be completely stuck on the ink film 62.

Subsequently, the upper press roll 15 is lifted up, and the next adhesive film 66 is then inserted between the press rolls 15 and 16 through the run of the peeling paper 58.

Figure 7:
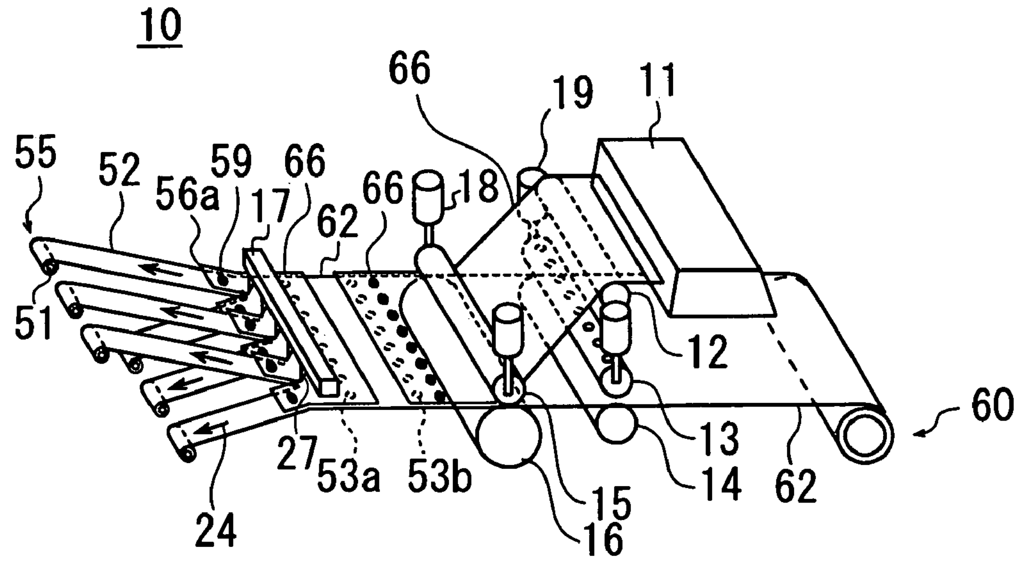
FIG. 7 is a diagram for illustrating the production step following that shown in FIG. 6.

Moreover, when the ink film 62 and the adhesive film 66 stuck on the surface thereof pass together below the slit knife unit 17, the ink film 62 and the adhesive film 66 are cut in parallel along their running direction with knives 27. FIG. 7 shows a state in the cutting process wherein ink ribbons 52 are obtained from the portion where the ink film 62 has been cut, and first adhesive tapes 56*a* are obtained from the portion where the adhesive film 66 has been cut. Each ink ribbon 52 is wound up to form an ink ribbon roll 50 and the first adhesive tape 56*a* becomes the winding terminating portion of the ink ribbon roll 50.

Reference numeral 59 in FIG. 7 denotes information provided on the first adhesive tape 56*a* and is obtained by cutting print portion of the information 69 on the adhesive film 66.

When the first adhesive tape 56*a* is formed, second holes 53*b* are formed in the downstream side of the ink film 62 with the perforator 13. At the same time, a next adhesive film 66 that will become the winding initiating portion of the ink ribbon roll 50 which will be produced next is sent to between the press rolls 15 and 16.

The adhesive film 66 is stuck on the ink film 62 sequentially from its head portion with the press rolls 15 and 16 when a portion of the ink film 62 where the second holes 53*b* have been formed has reached the position just before the rolls 15 and 16.

When the whole adhesive film 66 has been sent out from the press rolls 15 and 16, the adhesive film 66 is stuck on the region of the ink film 62 where the second holes 53*b* are located. Also on the surface of this adhesive film 62, predetermined information has been printed with the printer 11.

When the ink film 62 runs in that state, the adhesive film 66 that is to become a winding initiating portion is also cut with the slit knife unit 17 together with the ink film 62.

Figure 8:
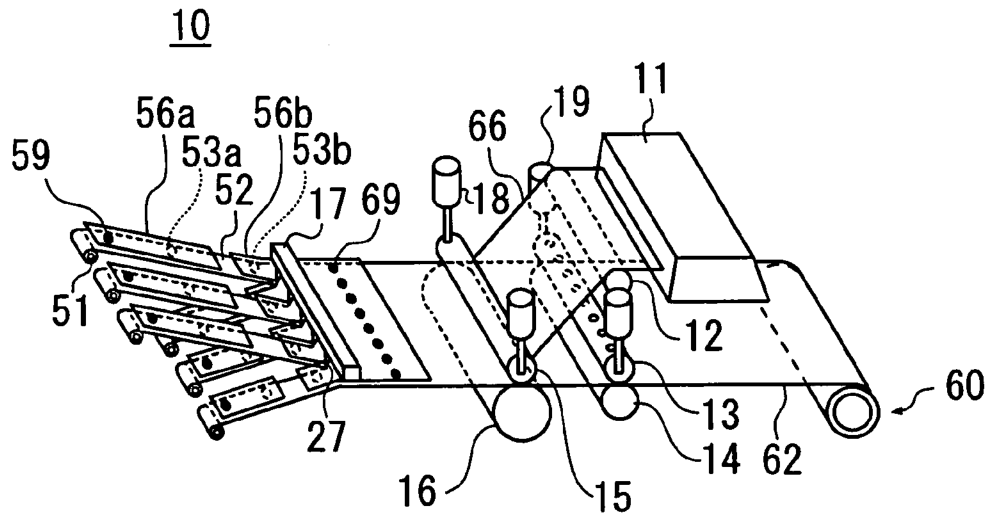
FIG. 8 is a diagram for illustrating the production step following that shown in FIG. 7.

FIG. 8 illustrates the state where the adhesive film 66 which is to become a winding initiating portion is under cutting. The second adhesive tapes 56*b* are obtained from the portion where the adhesive film 66 has been cut with the slit knife unit 17.

When the whole first adhesive tape 56*a* is wound up and the ink ribbon roll 50 is formed from a predetermined length of the ink ribbon 52, the ink ribbon roll 50 is separated through cutting, along the width direction, the ink ribbon 52 located between the first adhesive tape 56*a* and the second adhesive tape 56*b*. This ink ribbon roll 50 is shown in FIG. 1.

In the winding terminating position of the ink ribbon roll 50, the end of the ink ribbon 52 is stuck on the ink ribbon roll 50 itself with the first adhesive tape 56*a*. The portion in the winding terminating position of the ink ribbon 52, therefore, is not unwound from the ink ribbon roll 50.

After the removal of the ink ribbon roll 50 obtained, a new core 51 is installed. The adhesive layer 67 of the second adhesive tape 56*b* exposed in the bottoms of the second holes 53*b* is pressed against the core 51, whereby the head portion of the ink ribbon 52 is stuck on the core 51 with the second adhesive tape 56*b*. Subsequently, when the ink film 62 is caused to run with the rotation of the core 51, winding of the ink ribbon 52 is started. Following the starting of the winding, the ink ribbon 52 is wound in processes the same as that shown in FIGS. 4–8, forming a new ink ribbon roll 50.

As described above, the ink ribbon roll production apparatus 10 according to the present invention sticks adhesive films 66 onto the portions of an ink film 62 where first and second holes 53*a* and 53*b* have been formed, forming a winding initiating portion and a winding terminating portion of an ink ribbon 52. In the prior art, different films are adhere together, thereby constituting a winding initiating portion and a winding terminating portion. However, since the present invention does not adhere different films together, it has only a simple process and can achieve high operation efficiency.

Moreover, particularly, the ink ribbon roll production apparatus 10 described above sticks an adhesive film 66 to an ink film 62 while causing the adhesive film 66 and the ink film 62 to run in the same direction. Therefore, it is not necessary to stop the ink film 62 and is able to perform continuous production.

Next, the second example of the ink ribbon roll production apparatus according to the present invention will be described.

Figure 9:
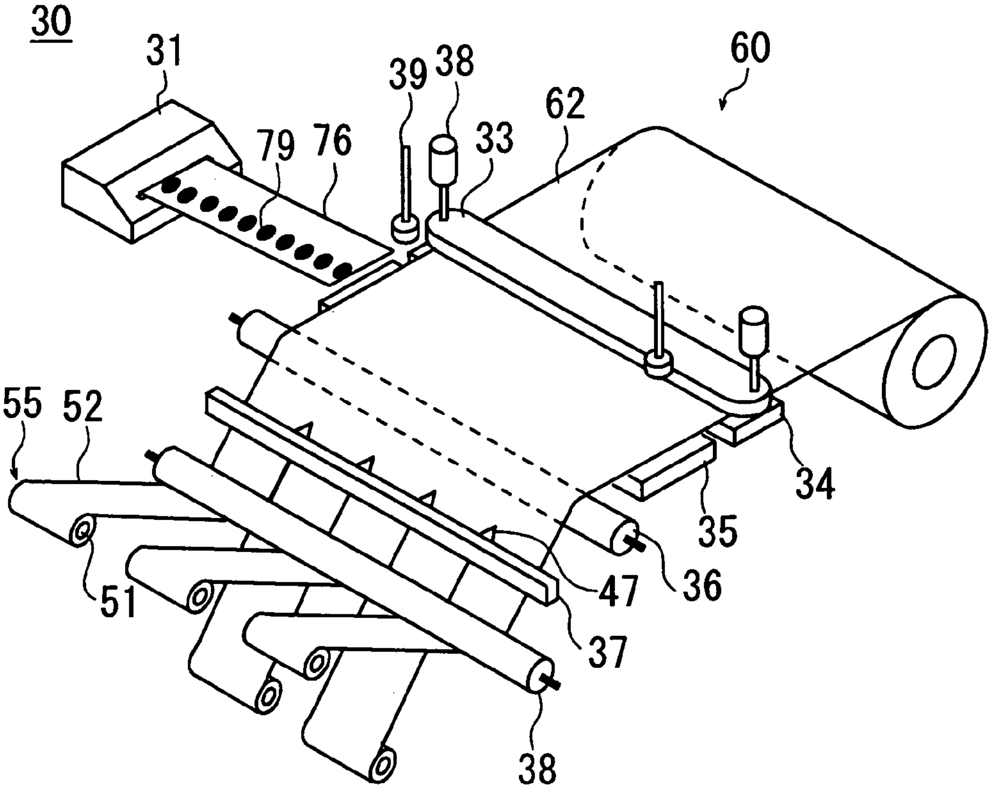
FIG. 9 is a diagram for illustrating another roll production apparatus and production process according to the present invention.

With reference to FIG. 9, reference numeral 30 denotes the second example of the ink ribbon roll production apparatus of according to the present invention.

This ink ribbon roll production apparatus 30 has a printer 31, a perforator 33, and a slit knife unit 37.

Reference numeral 60 in FIG. 9 denotes an ink film roll the same as that used in the above-described ink ribbon roll production apparatus 10.

An ink film 62 sent out from the ink film roll 60 passes below the perforator 33, followed by being slanted its running direction downward with a rotation roll 36, thereby being introduced to a position near the slit knife unit 37.

The slit knife unit 37 has a plurality of knives 47. The ink film 62 arrived is cut in parallel along its running direction with the knives 47, yielding a plurality of ink ribbons 52. Here, the slit knife unit 37 has four knives 47, and the ink film 62 is divided into five ink ribbons 52.

Each ink ribbon 52 is wound around each core 51. Reference numeral 55 denotes an ink ribbon roll of the ink ribbon 52 under winding.

In this ink ribbon roll production apparatus 30, the printer 31 is installed in a position by the side of the ink film 62. Reference numeral 76 denotes an adhesive film narrower than the adhesive film 66 of the first example. The sectional structure of this adhesive film 76 is the same as that of the adhesive film 66 used in the ink ribbon roll production apparatus 10 of the first example. This adhesive film 76 is also stuck on a peeling paper, which, however, is omitted in the drawing.

An adhesive film roll including the wound-up adhesive film 76 is installed in the printer 31. In the printer 31, the adhesive film 76 is sent out from the adhesive film roll and information is printed on the surface of a print layer 68 of the adhesive film 76 with a printer head, and then, the adhesive film 76 is sent out of the printer 31 together with the peeling paper.

The adhesive film 76 subjected to printing in the printer 31 is sent out toward a position above the ink film 62 and between the perforator 33 and the rotation roll 36. The black dots shown by reference numeral 79 in FIG. 9 denote the information printed in the printer 31.

The perforator 33 is equipped with a cylinder 38. When the ink ribbon 52 has been wound around the core 51 by a predetermined length, running of the ink ribbon 62 is suspended and then the perforator 33 gets down through the action of the cylinder 78.

Figure 15A:
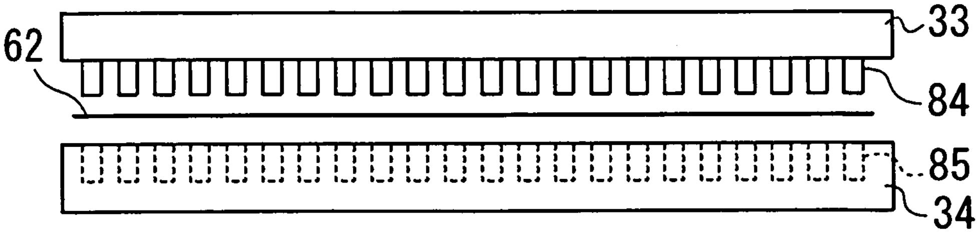
FIGS. 15(*a*) and 15(*b*) illustrate other examples of a perforator used for the present invention.
Figure 15B:
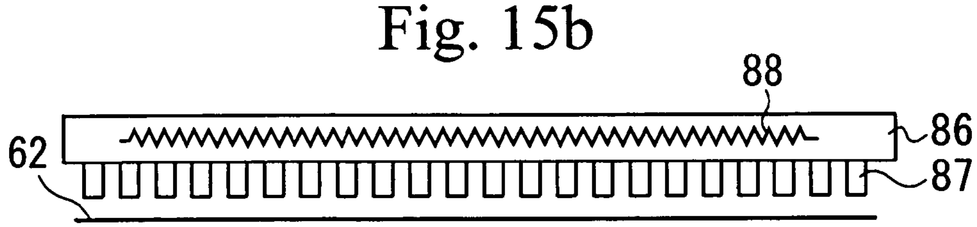

A side view of this perforator 33 is shown in FIG. 15(*a*). The perforator 33 has a board-like shape and has a plurality of projections 84 in its bottom. In this figure, the projections are arranged in a row. A reception board 34 is disposed below the perforator 33 and the ink film 62.

In the surface of the reception board 34, recesses 85 are formed at the positions corresponding to the projections 84. The perforator 33 is moved downward and the lower ends of the projections 84 are pressed against the ink film 62. The perforator 33 is then further lowered, whereby the projections 84 are caused to fit into the recesses 85. Thus, the ink film 62 is punched with each projection 84 and first holes 53*a* are formed. Subsequently, the upward movement of the perforator 33 makes the ink film 62 enabling to run.

Figure 10:
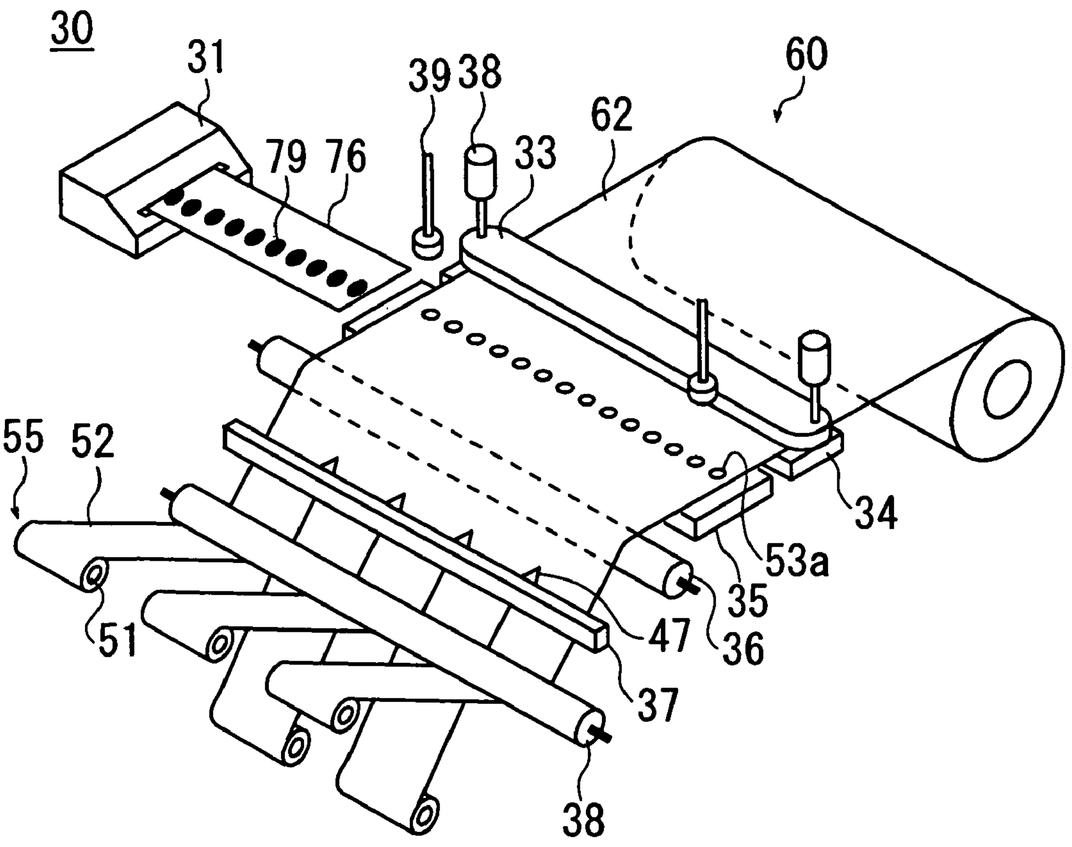
FIG. 10 is a diagram for illustrating the production step following that shown in FIG. 9.

FIG. 10 illustrates the state where after the formation of the first holes 53*a*, the ink film 62 runs and the first holes 53*a* have come out from between the perforator 33 and the reception board 34. The first holes 53*a* are arranged in a row along the width direction of the ink film 62.

In this state, an adhesive film 76 is sent out of the printer 31 together with the peeling paper, and when the adhesive film 76 has covered the ink film 62 in the width direction thereof, it is caused to stop.

A support board 35 is disposed in a position below the ink film 62 and between the reception board 34 and the rotation roll 36. The adhesive film 76 at rest is above the support board 35.

Moreover, a vacuum stick unit 39 is disposed at a position above the support board 35 and further above the adhesive film 76. After the separation of the peeling paper by fixing of the surface of the adhesive film 76 with the vacuum stick unit 39, the vacuum stick unit 39 is lowered, thereby pressing the adhesive layer 67 of the adhesive film 76 against the surface of the ink film 62 supported on the support board 35.

Figure 11:
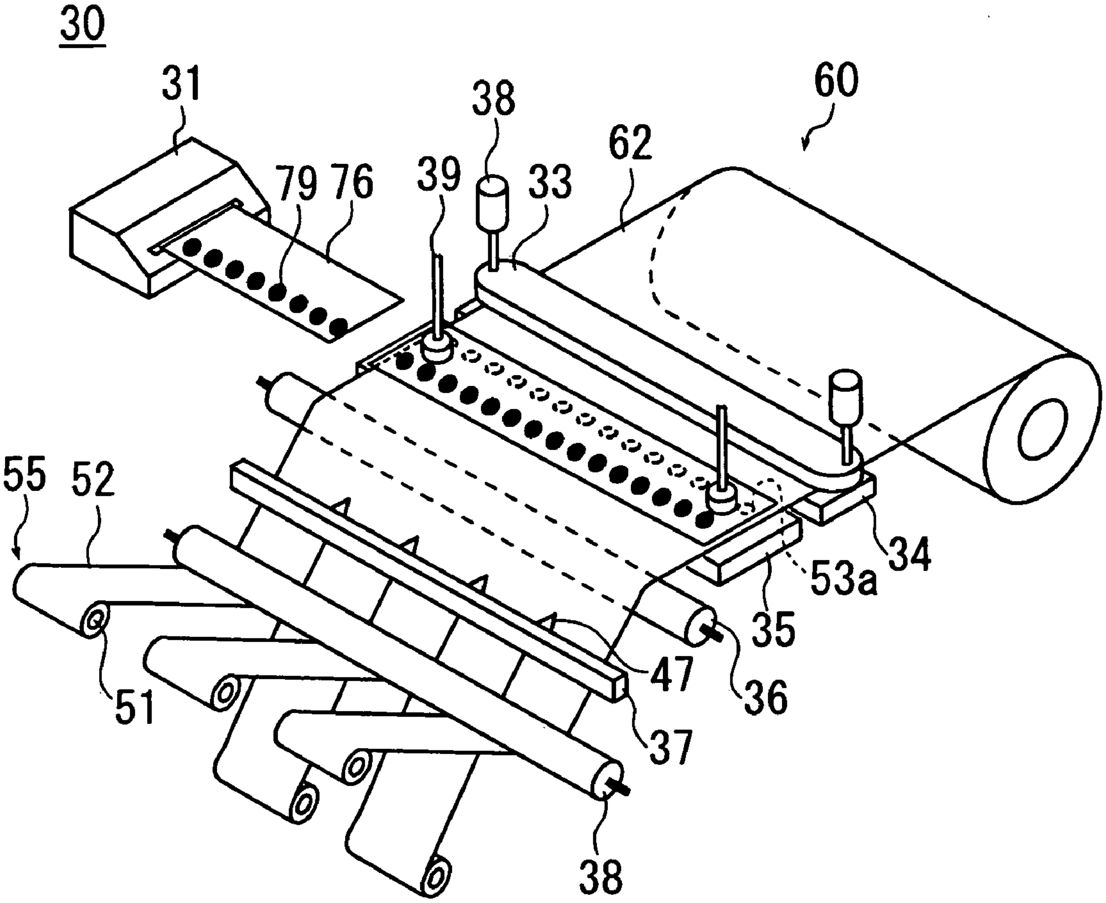
FIG. 11 is a diagram for illustrating the production step following that shown in FIG. 10.

FIG. 11 shows this state. The adhesive film 76 is stuck on the surface of the region of the ink film 62 where the first holes 53*a* are arranged, whereby the adhesive layer of the adhesive film 76 is exposed in the first holes 53a. The adhesive film 76 is stuck on the substrate layer 65 of the ink film 62.

Figure 12:
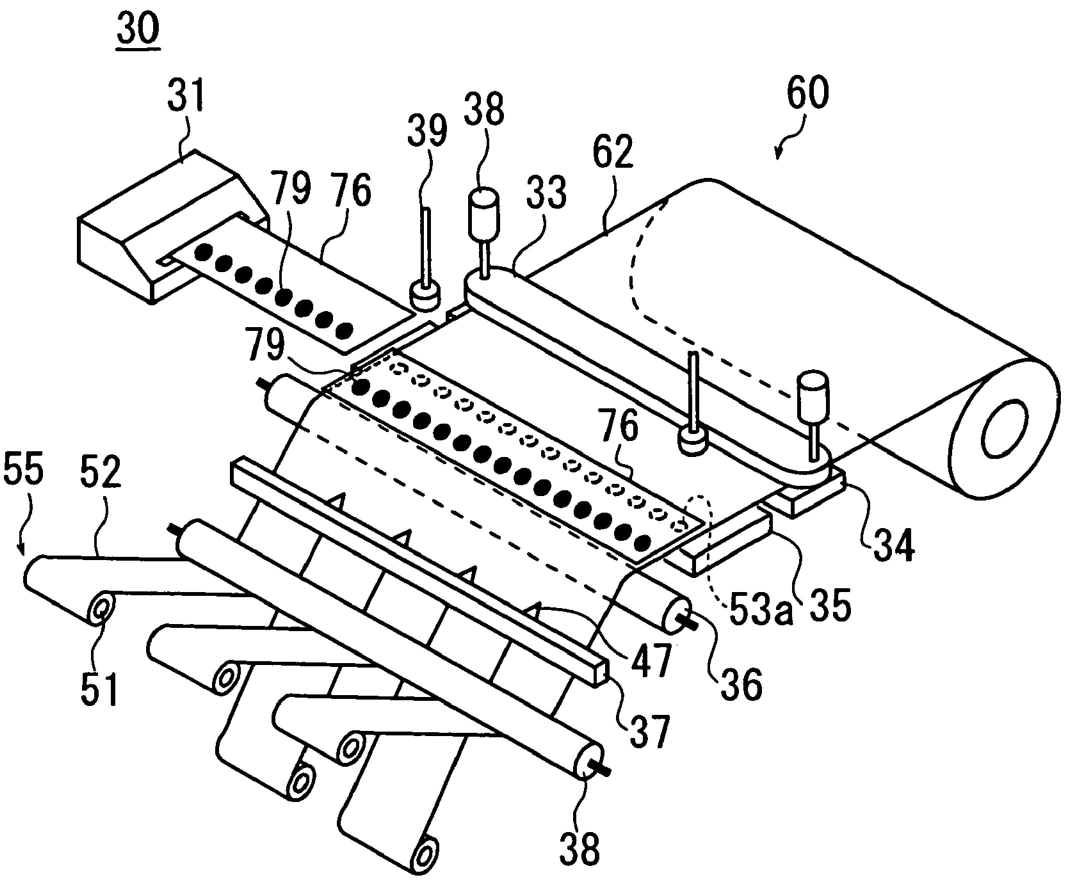
FIG. 12 is a diagram for illustrating the production step following that shown in FIG. 11.

Subsequently, as shown in FIG. 12, the adhesive film 76 is cut, and separated from the adhesive film roll in the printer 31. At the same time, the adhesive film 76 stuck on the ink film 62 is made equal to the width of the ink film 62.

Next, when the ink film 62 is caused to run, the adhesive film 76 stuck is sent to the slit knife unit 37 and is cut together with the ink film 62, resulting in first adhesive tapes 56*a* of the structure illustrated in FIGS. 3(*a*)–(*c*).

The winding terminating position of the ink ribbon 52 is explained in FIGS. 9–12, and the winding initiating portion will be described. In this ink ribbon roll production apparatus 30, after the formation of the first holes 53*a*, the ink film 62 is made run by a predetermined length. Then, second holes 53*b* are formed with the perforator 33 and the receptacle board 34. By sticking the next adhesive film 76 on the region where the second holes 53*b* have been formed, the winding initiating portion of the ink ribbon 52 can be produced.

Although the aforementioned perforators 13 and 33 engage their projections 82 and 84 to the recesses 83 and 85 of the reception roll 14 or the reception board 34 and form the first and second holes 53*a* and 53*b* in the ink films 62, the present invention is not restricted to such embodiments.

A perforator 86 illustrated in FIG. 15(*b*) has a heater 88 installed thereinside and is constituted so that when the heater 88 is energized, plural projections 87 provided in the bottom of the perforator 86 are heated.

By only pressing the heated projections 87 of the perforator 86 against the surface of the ink film 62 composed of a thermally meltable resin, the pressed portion of the ink film 62 melts, forming first and second holes 53*a* and 53*b*.

Cracks easily appear in the ink film 62 around the first and second holes 53*a* and 53*b*. However, when this perforator 86 presses its projections 87 against the ink film 62 while running the film slowly, thereby melting it, the melt becomes a rise around each of the first and second holes 53*a* and 53*b*. Thereby, the ink film 62 is difficult to generate cracks around the first and second holes 53*a* and 53*b*. When forming the first and second holes 53*a* and 53*b* while running the ink film 62 slowly, the first and second holes 53*a* and 53*b* to be formed become oval even if the projections 87 are cylindrical.

Figure 16A:
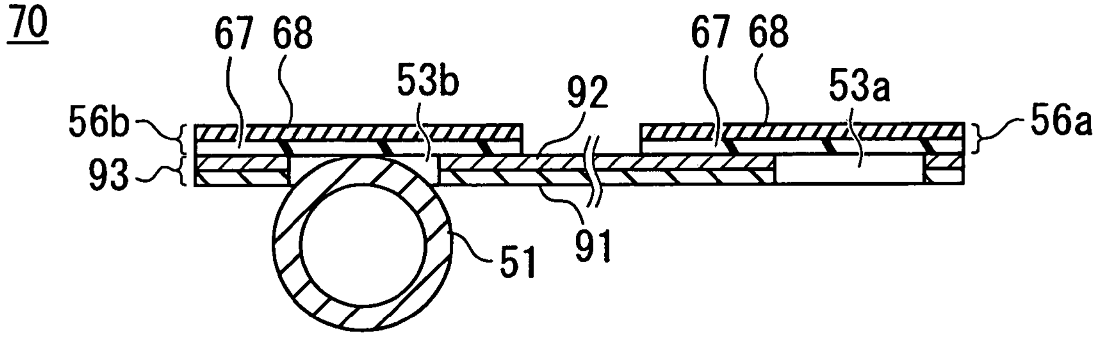
FIGS. 16(*a*) and 16(*b*) illustrate other examples of the roll according to the present invention.
Figure 16B:
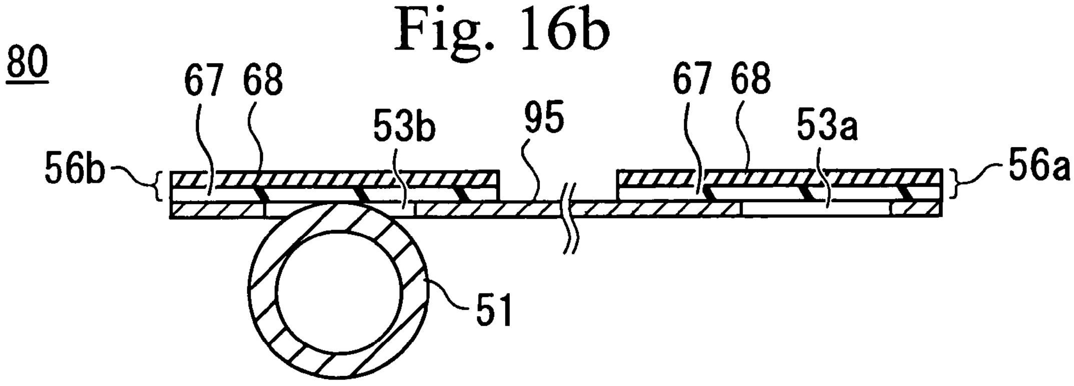

Although explanation was made above by taking an ink ribbon roll 50 including an ink ribbon 52 wound as an example, the roll according to the present invention is not limited to rolls of ink ribbons. Reference numeral 93 in FIG. 16(*a*) denotes a magnetic tape used for video recording. This figure shows the state where the whole magnetic tape 93 has been unwound from a roll 70 including the magnetic tape 93 wound.

This magnetic tape 93 is constituted of a substrate layer 91 including a film of resin such as polyester and a magnetic layer 92 formed thereon.

In the winding terminating portion and the winding initiating portion of the magnetic tape 93, first and second holes 53*a* and 54*b* are formed. On the regions of the magnetic layer 92 where the first and second holes 53*a* and 53*b* are formed, a first and second adhesive tapes 56*a* and 56*b* are stuck, and the surfaces of the adhesive layers 67 of the first and second adhesive tapes 56*a* and 56*b* are exposed in the bottoms of the first and the second holes 53*a* and 53*b*.

The adhesive layer 67 exposed in the bottoms of the second holes 53*b* in the winding initiating portion is adhered to the core 51, thereby the winding initiating portion of the magnetic tape 93 is stuck on the core 51 with the second adhesive tape 56*b*. On the surface of the first adhesive tape 56*a* is printed information such as a manufacture lot number.

The following is an explanation on another example. Reference numeral 95 in FIG. 16(*b*) indicates a resin tape used for goods packing, etc. This figure shows the state where the whole resin tape 95 has been unwound from a roll 80 including the resin tape 95 wound.

Like the aforementioned ink ribbon 52 and magnetic tape 93, this resin tape 95 is also provided with first and second holes 53*a* and 53*b* in its winding terminating portion and winding initiating portion, respectively. The first and second adhesive tapes 56*a* and 56*b* are stuck on the surfaces of the regions where the first and second holes 53*a* and 53*b* are formed. Predetermined information 59 is printed on the first adhesive tape 56*a* as shown in FIG. 1.

Figure 17A:
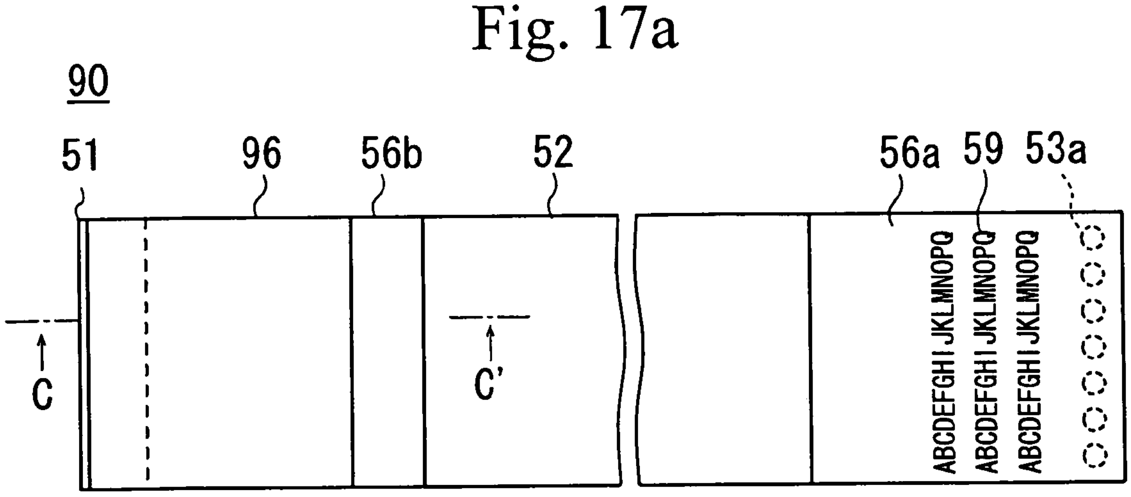
FIGS. 17(*a*) through 17(*c*) illustrate other examples of the roll according to the present invention.
Figure 17B:
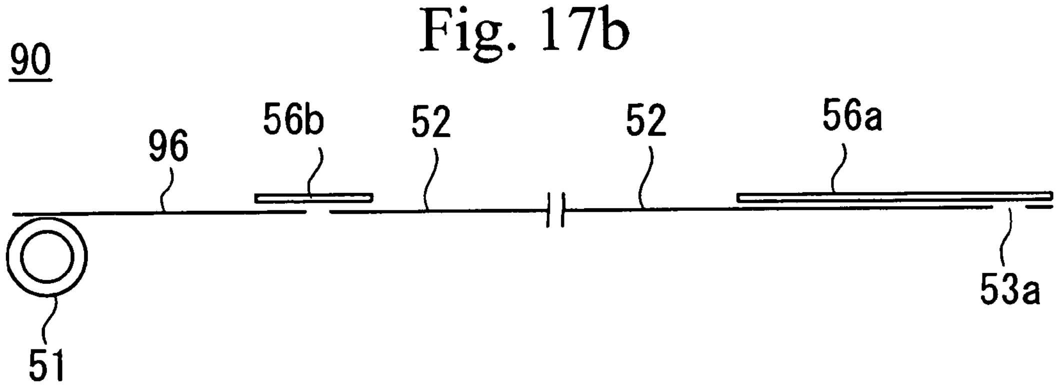
Figure 17C:
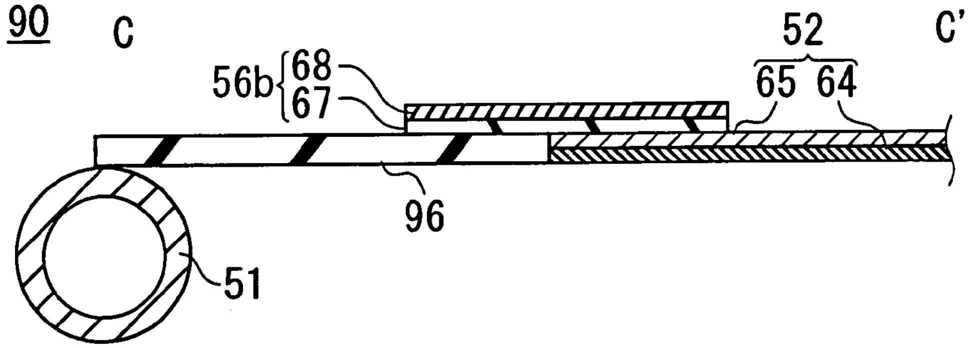
Figure 18A:
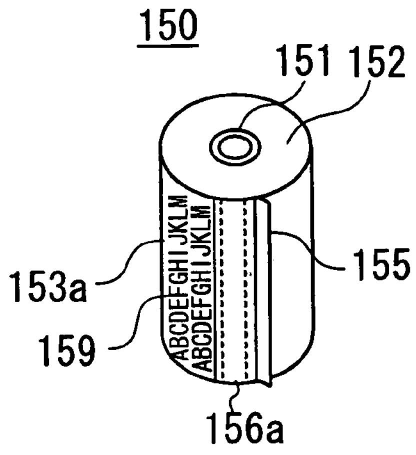
Fig. 18a (PRIOR ART)
FIGS. 18(*a*), 18(*b*) and 18(*c*) are, respectively, a diagram showing a prior art roll, a plan view illustrating the state where a tape has been sent out from the roll, and a side view illustrating that state.
Figure 18B:
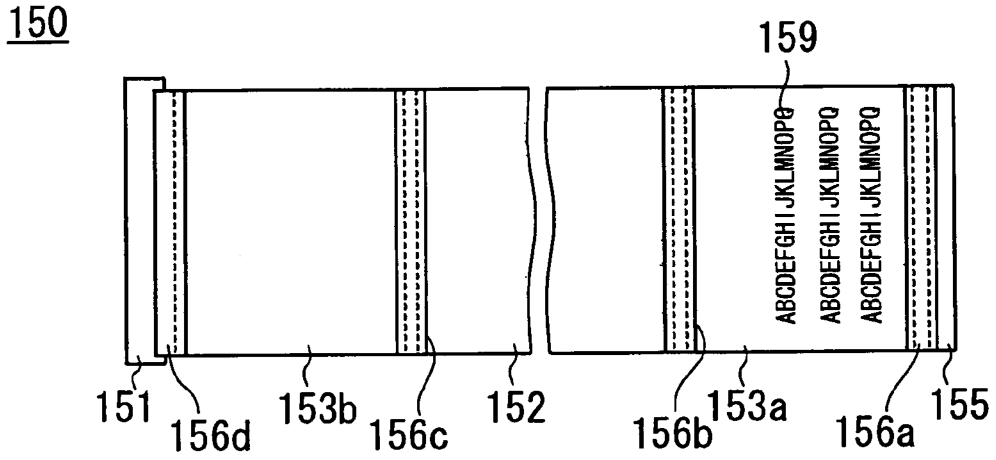
Fig. 18b (PRIOR ART)
Figure 18C:
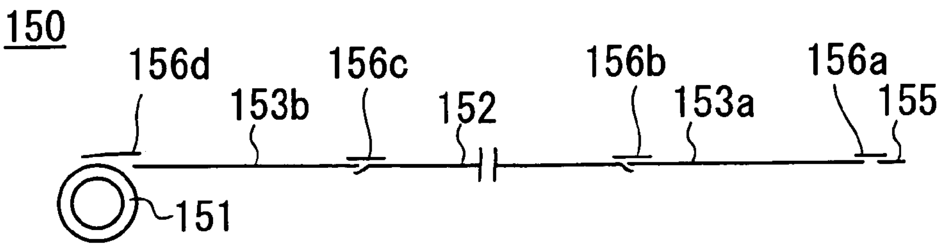
Fig. 18c (PRIOR ART)
Figure 19:
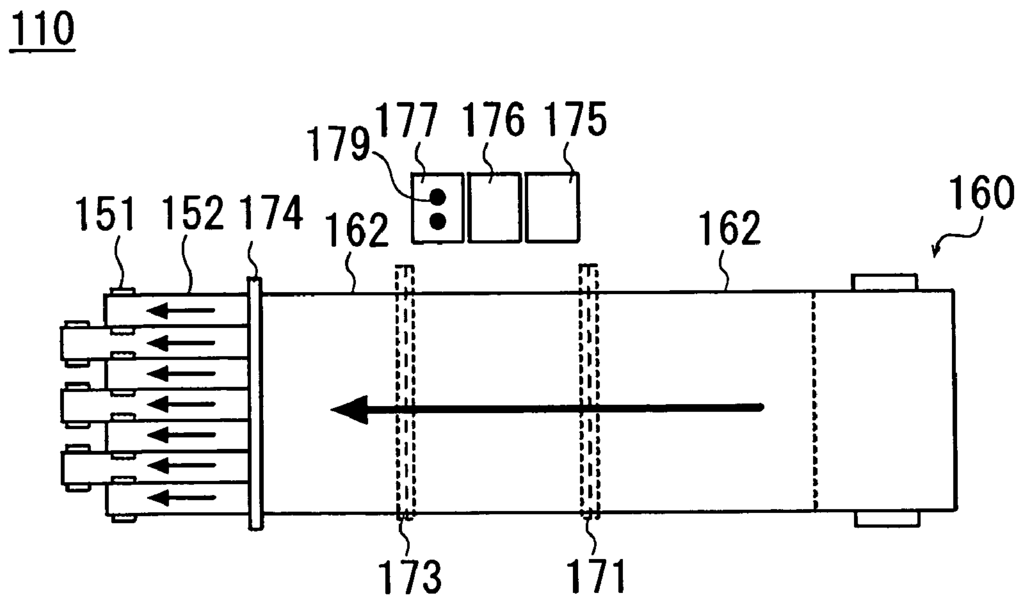
Fig. 19 (PRIOR ART)
FIG. 19 is a diagram for illustrating a roll production apparatus and production process of the prior art.
Figure 20:
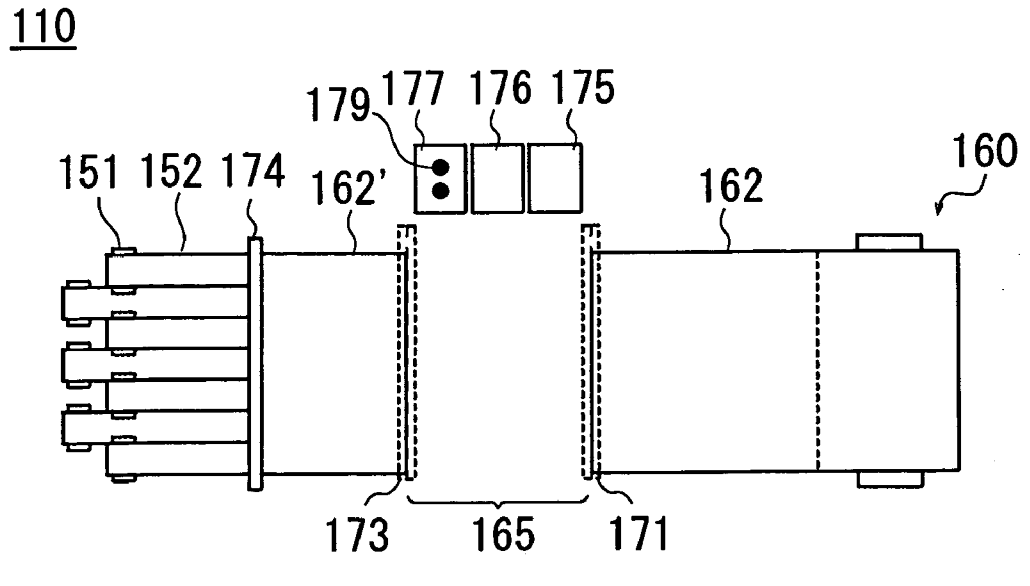
Fig. 20 (PRIOR ART)
FIG. 20 is a diagram for illustrating the production step following that shown in FIG. 19.
Figure 21:
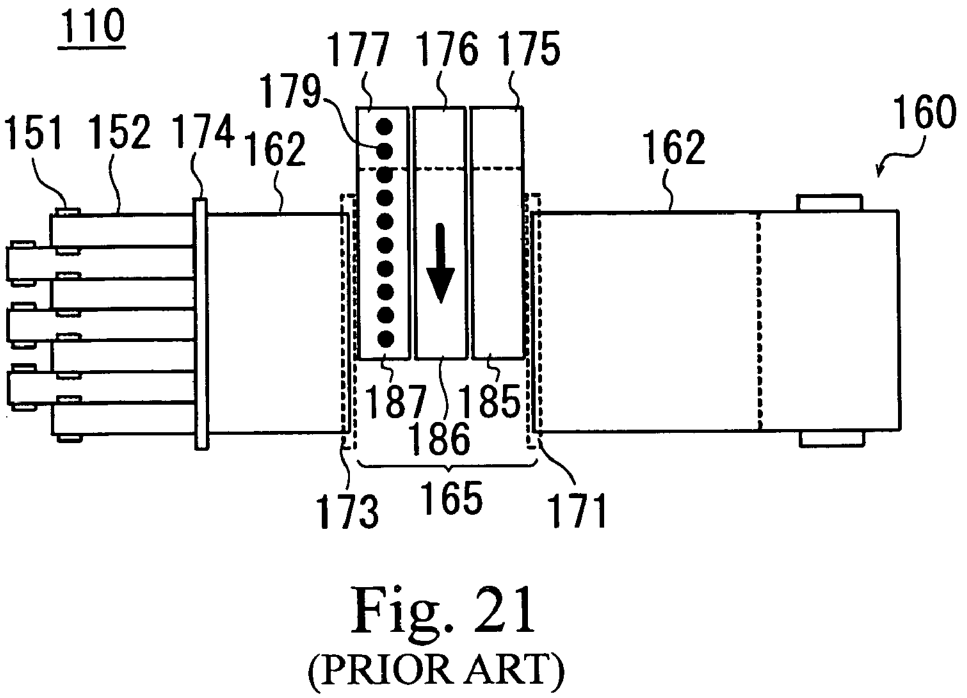
Fig. 21 (PRIOR ART)
FIG. 21 is a diagram for illustrating the production step following that shown in FIG. 20.
Figure 22:
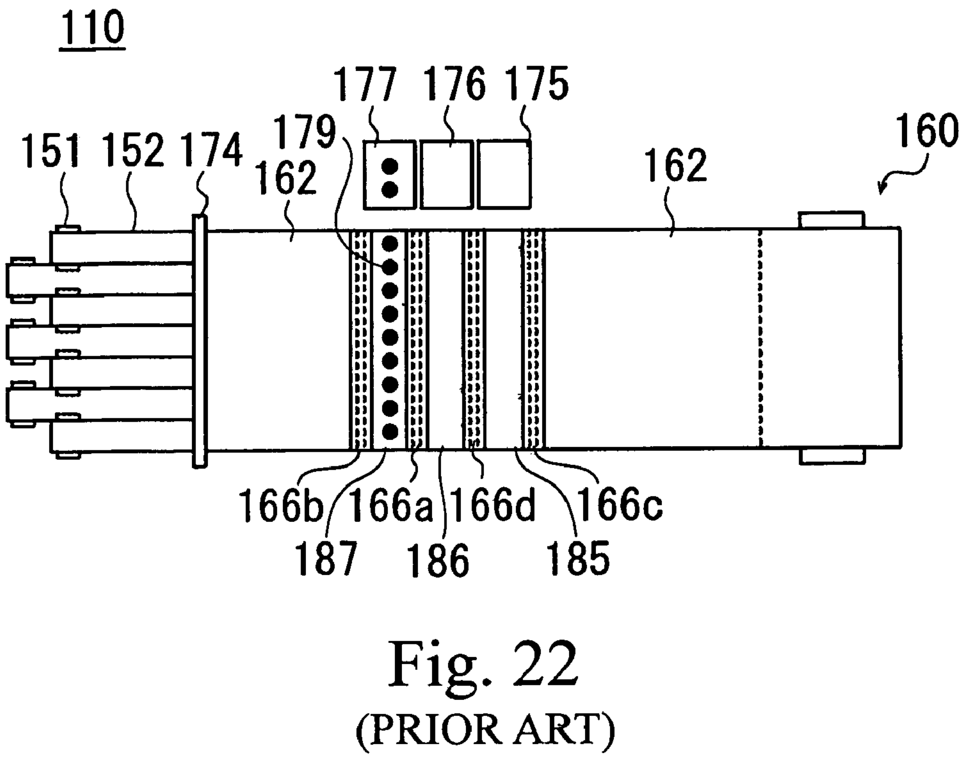
Fig. 22 (PRIOR ART)
FIG. 22 is a diagram for illustrating the production step following that shown in FIG. 21.

The following is an explanation of still another example of the present invention. Reference numeral 90 in FIGS. 17(*a*)–(*c*) denotes a roll having an aluminum deposit tape 96 disposed in the winding initiating position of an ink ribbon 52. One end of the aluminum deposit tape 96 is stuck to an end of the ink tape 52 with the second adhesive tape 56*b*. Moreover, another end of the aluminum deposit tape 96 is stuck on the core 51 with adhesives.

Also in this roll 90, first holes 53*a* are formed in the winding terminating position of the ink tape 52 and the first adhesive tape 56*a* is stuck on it. Information 59 of predetermined items is printed on the surface of the first adhesive tape 56*a*.

The production process according to the present invention includes only a simple production process since a tape is stuck on a core or a roll itself with adhesive tapes exposed in the bottoms of holes. In addition, since characters or the like are printed in advance on the adhesive tapes, it is not necessary to use tapes only for printing.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A process for producing a roll using disposed a slit knife unit, a printer, a wide main film and an adhesive film, comprising the steps of:

extending said wide main film along a running direction perpendicular to a width of said wide main film;

printing a desired item on a first surface of said adhesive film with said printer, said adhesive film having adhesive on a second surface;

adhering said adhesive film by said second surface onto a third surface of said main film while extending said adhesive film along said running direction;

extending said adhesive film and said main film together along said running direction;

cutting said adhesive film together with said main film along the running direction by the slit knife unit to produce a plurality of narrow main tapes; and winding each of said plurality of narrow main tapes to produce a corresponding narrow roll, wherein said adhesive film printed with the desired item on the surface is arranged on a surface of a portion of said main film where the portion becomes a winding terminating position of said main tapes; a hole is formed in said main film and said adhesive film is thereafter stuck over said hole, and said adhesive film exposed in a bottom of said hole adheres to a surface of said main tape wound in said roll.

2. The process for producing a roll according to claim 1, wherein said adhesive film is sent in the direction along the running direction of said main film and is stuck on a surface of said main film.

3. The process for producing a roll according to claim 1, wherein said adhesive film is sent in the direction perpendicular to the running direction of said main film and is stuck on a surface of said main film.

4. The process for producing a roll according to claim 1, wherein said printer is disposed along the running direction of said main film in the upstream side from said slit knife unit.

* * * * *